(12) United States Patent
De Souza et al.

(10) Patent No.: US 11,396,008 B2
(45) Date of Patent: Jul. 26, 2022

(54) CATALYTIC SYSTEM, AND PROCESS FOR REMOVING HETEROATOMIC COMPOUNDS FROM HYDROCARBON STREAMS

(71) Applicants: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

(72) Inventors: Wladmir Ferraz De Souza, Rio de Janeiro (BR); Janice Adamski, Porto Alegre (BR); Jairton Dupont, Porto Alegre (BR)

(73) Assignees: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

( * ) Notice: Subject to any disclaimer, the term of this patent is extended or adjusted under 35 U.S.C. 154(b) by 410 days.

(21) Appl. No.: 16/620,453

(22) PCT Filed: Jan. 8, 2018

(86) PCT No.: PCT/GB2018/051574
§ 371 (c)(1),
(2) Date: Dec. 6, 2019

(87) PCT Pub. No.: WO2018/224846
PCT Pub. Date: Dec. 13, 2018

(65) Prior Publication Data
US 2020/0179915 A1   Jun. 11, 2020

(30) Foreign Application Priority Data
Jun. 9, 2017 (BR) ...................... 10 2017 012313-8

(51) Int. Cl.
| | |
|---|---|
| *B01J 35/12* | (2006.01) |
| *C10G 27/10* | (2006.01) |
| *C10G 27/12* | (2006.01) |
| *B01J 31/18* | (2006.01) |
| *B01J 31/02* | (2006.01) |

(52) U.S. Cl.
CPC ....... *B01J 31/1815* (2013.01); *B01J 31/0281* (2013.01); *B01J 31/0298* (2013.01); *B01J 35/12* (2013.01); *C10G 27/10* (2013.01); *C10G 27/12* (2013.01); *B01J 2231/70* (2013.01); *B01J 2531/842* (2013.01); *C10G 2300/202* (2013.01); *C10G 2300/4006* (2013.01); *C10G 2300/70* (2013.01)

(58) Field of Classification Search
CPC ............... B01J 31/0281; B01J 31/0298; B01J 31/1815; B01J 35/12; B01J 2231/70; B01J 2531/842; C10G 27/10; C10G 27/12; C10G 2300/70; C10G 2300/202; C10G 2300/4006
See application file for complete search history.

(56) References Cited

U.S. PATENT DOCUMENTS

2009/0288992 A1\* 11/2009 Victorovna Likhanova ................ C10G 21/22
252/191
2012/0018350 A1   1/2012 Lin et al.

OTHER PUBLICATIONS

H. Li et al., Deep Oxidative Desulfurization of Fuels in Redox Ionic Liquids Based on Iron Chloride, 11 Green Chem. 810-815 (2009).\*
International Search Report and Written Opinion corresponding to PCT/GB2018/051574, dated Dec. 13, 2 018.
Huaming, Li, et al., "Deep oxidative desulfurization of fuels in redox ionic liquids based on iron chloride", Green Chemistry, vol. 11, No. 6, Jan. 1, 2009, p. 810.
Kowsari, Elaheh, "Recent Advances in the Science and Technology of Desulfurization of Diesel Fuel Using Ionic Liquids", In: "Ionic Liquids—New Aspects for the Future", Jan. 23, 2013.

\* cited by examiner

*Primary Examiner* — Randy Boyer
(74) *Attorney, Agent, or Firm* — ArentFox Schiff LLP

(57) ABSTRACT

The present invention describes an extractive oxidation process for removing contaminants from hydrocarbon streams using an ionic liquid combined with an organometallic ionic complex of iron(II), which comprises a complex of iron(II) cation with an ionophilic binder, catalyst of iron(II) with ionophilic binder in its molecular structure, oxidation of which is performed with an oxidizing agent and is catalysed by the organometallic iron(II) complex present in the phase of the ionic liquid.

Besides maintaining its characteristics of selective solvent of oxidizing compounds, the ionic liquid combined with the organometallic complex of iron(II) with catalytic ionophilic binder of the oxidizing agent, stimulating the reactive phenomenon taking place in the ionic liquid phase, with the effect that the iron remains stable in the ionic liquid phase, without being leached into the oily phase. This measure results in a considerable improvement in removal of the heteroatoms from the hydrocarbon medium.

20 Claims, No Drawings

CATALYTIC SYSTEM, AND PROCESS FOR REMOVING HETEROATOMIC COMPOUNDS FROM HYDROCARBON STREAMS

CROSS-REFERENCE TO RELATED APPLICATION

This application is a U.S. National Stage entry under 35 U.S.C. § 371 based on International Application PCT/GB2018/051574, filed on Jun. 8, 2018, which claims the benefit of priority to BR 10 2017 012318-8, filed 9 Jun. 2017. The embodiment of the priority application are hereby incorporated herein in their entirety by reference.

FIELD OF THE INVENTION

The present invention relates to extractive oxidation processes using an ionic phase containing an ionic liquid combined with an Fe(II) complex with an ionophilic binder system with catalytic function of activation of the oxidizing agent.

In extractive oxidation processes contaminants are removed from an oily phase, generally from hydrocarbons, including those of fossil origin, normally rich in heteroatomic compounds, using mild conditions of atmospheric pressure and temperature. The ionophilic binder system is responsible for maintaining the iron cation in the ionic phase, operating as a catalyst, without it being leached into the oily phase.

BACKGROUND OF THE INVENTION

An untreated stream of hydrocarbons of fossil origin normally contains heteroatomic compounds, classified as contaminants or impurities. The heteroatomic compounds most commonly found in these streams are compounds generally containing sulphur atoms (S) and nitrogen atoms (N), as well as compounds containing oxygen (O), and metals such as nickel (Ni), iron (Fe), copper (Cu), sodium (Na) and vanadium (V).

Compounds containing sulphur (S) and nitrogen (N) are the most prevalent contaminants and are present in various types of petroleum. These sulphur-containing and nitrogen-containing contaminants cause problems in handling (reduction of the efficiency of catalysts in the refinery), transport (corrosion in oil and gas pipelines) and use of derivatives (they cause environmental pollution if present in fuels derived from petroleum).

A table is presented below that gives examples of the elemental composition of crude oil (wt %).

| | |
|---|---|
| Hydrogen | 11-14% |
| Carbon | 83-87% |
| Sulphur | 0.06-6% |
| Nitrogen | 0.11-1.7% |
| Oxygen | 0.1-2% |
| Metals | up to 0.3% |

Alternative processes for removing sulphur compounds and nitrogen compounds present in streams of fossil hydrocarbons have been developed both for adjusting the technical and environmental specifications of the products and for minimizing the harshness of conventional processes.

In the oil refining industry, some treatment processes are used conventionally for removing sulphur and nitrogen present in these contaminants, for example hydrofining processes, such as hydrodesulphurization (HDS) and hydrodenitrogenation (HDN).

The conventional processes of hydrodesulphurization (HDS) and hydrodenitrogenation (HDN) consist respectively of removing sulphur and nitrogen from contaminants of various petroleum cuts by means of hydrogenation reactions in the presence of catalysts, which are typically supported metal sulphides. However, certain sulphur-containing and nitrogen-containing contaminants are difficult to treat by the conventional routes, for example some nitrogen-containing compounds poison the catalyst, and require harsher operating conditions. It then becomes necessary to develop new catalysts and/or alternative routes of treatment processes, such as the methods of extractive oxidation of heteroatomic compounds. In extractive oxidation processes the contaminants are removed and/or made inert or converted to other compounds that have greater affinity for solvents that are immiscible in the oil or for adsorbents.

The prior art describes alternative treatment processes for removing heteroatomic compounds from hydrocarbon streams.

U.S. Pat. Nos. 6,544,409 and 7,153,414 teach extractive oxidation processes for the pre-treatment of distillates from crude oils, rich in heteroatomic contaminants, that are applicable to the pre-treatment of hydrocarbon streams. Both documents state that the method of extractive oxidation performed with peracids possesses advantages, such as removing certain compounds that are difficult to remove by hydrofining, such as substituted and nitrogenated dibenzothiophenes, and pyridine and quinoline compounds. These compounds are strong deactivators of supported metal sulphide catalysts.

One way of achieving improvements in the process for removing heteroatomic compounds comprises addition of ionic liquids to a reaction mixture. Ionic liquids are known, such as molten salts at a temperature below 100° C., which normally consist of salts derived from alkylammonium, phosphonium and imidazolium cations, having as anions (counter-ion) structures such as $BF_4^-$, $PF_6^-$, $CF_3SO_3^-$, $(CF_3SO_2)_2N$; $CF_3CO_2^-$ (P. Wasserscheid, T. Welton; *Ionic Liquids in Synthesis*, VCH-Wiley, Weinheim, 2002; J. Dupont; R. F. De Souza, P. A. Z. Suarez; *Chem. Rev.;* 2002, 102, 3667; P. Wasserscheid, W. Keim; *Angew. Chem. Int. Ed.;* 2000, 39, 3773; T. Welton; *Chem. Rev.;* 1999, 99, 2071).

Owing to their intrinsic characteristics, ionic liquids can act as solvents and/or catalysts in chemical reactions, and as ions are involved in place of molecules, the reactions proceed with different selectivity and reactivity when compared to those carried out in conventional organic solvents.

Among the various functionalized ionic liquids, those that have received most study and have been used most are those derived from the 1,3-dialkylimidazolium cation, as they possess unique physicochemical properties.

U.S. Pat. No. 7,001,504 teaches a process that uses ionic liquids for the extraction and/or extractive oxidation of sulphur-containing compounds present in hydrocarbon streams. However, the methodology applies exclusively to the removal of sulphur compounds in hydrocarbon streams, without tackling the removal of other contaminants, such as nitrogen-containing compounds that are typical of crude streams of hydrocarbons derived from petroleum.

Patent application BR PI 0704672-3 presents an improvement of the methodology that is described in document EP 1620528. This improvement combines the action of an ionic liquid with the action of the organic acid/hydrogen peroxide oxidizing system. This new system is applied to the pretreatment of crude streams of complex mixtures of hydrocarbons, such as streams of fossil origin, rich in heteroatomic contaminants (nitrogen-containing and/or sulphur-containing) and compounds. The system allows greater removal of these contaminants, not exclusively sulphur and accordingly consists of more extensive extractive oxidation than that claimed in document U.S. Pat. No. 7,001,504.

The invention described in document BR PI 0704672-3 involves a three-phase system formed by the hydrocarbon phase; the phase of aqueous oxidizing mixture containing peroxide and acid; and the phase of the ionic liquid that optimizes physical phenomena that govern the extractive oxidation process, such as migration of the polar substances between the phases.

The ionic liquid presented in document BR PI 0704672-3 possesses an exclusively physical function and the reaction takes place using a peracid system ($H_2O_2$+RCOOH) that performs the actual oxidation reaction of the contaminating compounds. The ionic liquid acts by increasing the interaction of the aqueous solution with the species to be oxidized as well as with the species that have been oxidized, allowing improvement in the extraction thereof.

However, despite the current developments, industry still needs a process that is more efficient and more effective for removing heteroatomic compounds from hydrocarbon streams.

Thus, as reported in the article (Lissner, E.; de Souza, W. F.; Ferrera, B.; Dupont, J.: Oxidative Desulfurization of Fuels with Task-Specific Ionic Liquids. *ChemSusChem* 2009, 2, 962-964), in an effort to expand the function of the ionic liquids, to operate chemically as well as physically, the methodology presented in document BR PI 0704672-3 was optimized through chemical modification of the ionic liquid in such a way that besides maintaining its characteristics of selective solvent of oxidizing compounds, it became a constituent of the peracid system responsible for oxidation, in place of the carboxylic acid of the aqueous oxidizing mixture. This forces the reactive phenomenon to take place in the ionic liquid phase to where the polar target substances and the hydrogen peroxide have migrated. This measure resulted in a considerable improvement in removal of the target substances from the hydrocarbon medium.

The chemical modification mentioned in the article cited above proceeds by incorporating functionalized substituents, such as carboxyl and/or ether functions, within the molecule of the imidazolium cation. This functionalization allowed the ionic liquid to operate both as a generator of a peracid system suitable for oxidizing sulphur-containing and nitrogen-containing compounds, and as a selective solvent. This solvent, once in contact with the oily phase, allows greater migration of target substances to the ionic phase, where they are oxidized, as well as allowing oxidation of target substances present at the interface with the oil, which end up migrating immediately and directly to the ionic phase.

On the other hand, according to U.S. Pat. No. 6,544,409, EP 1390441, and U.S. Pat. No. 7,153,414, the methodology of extractive oxidation of heteroatomic compounds may be enhanced by using a catalytic system based on iron oxide, and in particular iron oxide-hydroxide, which allows free radicals to be generated, including the Fenton reagent OH*, which potentiate oxidation. Accordingly, a promising concept is to incorporate iron in the chemical structure of the ionic liquid, or bind a system containing a catalytically active iron atom to the ionic liquid to allow free radicals to be generated (e.g. Fenton reagent OH*) in the ionic liquid phase, taking advantage of the potential of the ionic liquid for performing an important role of extraction of the target substances from the oily phase to the ionic liquid phase.

The results of efforts employing this concept are presented in the literature (Zhu, W. S.; Zhang, J. T.; Li, H. M.; Chao, Y. H.; Jiang, W.; Yin, S.; Liu, H.: Fenton-like ionic liquids/$H_2O_2$ system: one-pot extraction combined with oxidation desulfurization of fuel. *RSC Advances* 2012, 2, 658-664. Yu, G. R.; Zhao, J. J.; Song, D. D.; Asumana, C.; Zhang, X. Y.; Chen, X. C.: Deep Oxidative Desulfurization of Diesel Fuels by Acidic Ionic Liquids. *Ind. Eng. Chem. Res.* 2011, 50, 11690-11697. Ko, N. H.; Lee, J. S.; Huh, E. S.; Lee, H.; Jung, K. D.; Kim, H. S.; Cheong, M.: Extractive Desulfurization Using Fe-Containing Ionic Liquids. *Energy Fuels* 2008, 22, 1687-1689. Zhou, X.; Lv, S.; Wang, H.; Wang, X.; Liu, J.: Catalytic oxygenation of dibenzothiophenes to sulfones based on FeIII porphyrin complex. *Appl. Catal. A: Gen.* 2011, 396, 101-106). However, these methods apparently do not ensure that Fe ions are not leached into the oil phase.

SUMMARY OF THE INVENTION

The present invention provides a catalytic system for removing heteroatomic compounds from hydrocarbon streams, characterised in that it comprises an ionic liquid with 1,3-dialkylimidazolium cation, an anion and an organometallic complex of iron(II), in which the organometallic complex of iron(II) is an ionic system that consists of an organometallic cation of iron(II) with an ionophilic binder system and an anion. The catalytic system contains an ionic liquid combined with an organoferrous salt complex, completely soluble in the ionic liquid phase. This ionic organometallic complex has a chemical structure that gives strong affinity for the ionic liquid, being stabilized permanently in the ionic liquid phase.

Optionally, the 1,3-dialkylimidazolium is based on the compound 1-n-butyl-3-methylimidazolium.

Optionally, the anion is selected from tetrafluoroborate, hexafluorophosphate and bis-trifluoromethanesulphonimidate.

Optionally, the organometallic complex of iron(II) is prepared from an iron(II) salt and an ionophilic binder precursor.

Optionally the organometallic complex of iron(II) is prepared from an iron(II) bromide salt and 4-((2,3-dimethylimidazol-1-yl)methyl)-4'-methyl-2,2'-bipyridine.

According to another aspect the present invention provides an extractive oxidation process for removing heteroatoms from hydrocarbon streams, characterized in that it comprises the steps of:

a) providing a hydrocarbon stream of mineral or synthetic origin containing heteroatomic compounds to form phase I;

b) providing a catalytic system according to the invention and adding an oxidizing agent to form phase II;

c) promoting contact between phases I and II so that the reactions of oxidation of the heteroatomic compounds take place; and d) separating phase I, which comprises the hydrocarbon phase, from phase II, which comprises the phase of the ionic liquid combined with the organoferrous complex, where the oxidized heteroatomic compounds arising from the hydrocarbon stream are present.

Optionally, the oxidizing agent is a peroxide, suitably at least one inorganic peroxide, e.g. hydrogen peroxide, suitably at least one organic peroxide or suitably a mixture of at least one organic peroxide and at least one inorganic peroxide, in any proportions.

Optionally the heteroatomic compounds comprise sulphur-containing and/or nitrogen-containing compounds.

Optionally the oxidation reaction is carried out at a temperature varying from 50 to 150° C.

Optionally the oxidation reaction is carried out for periods of from 5 to 250 minutes.

The organometallic complex of iron(II) consists of an ionophilic binder system that complexes an Fe(II) cation, which can act as a catalyst of reactions generating oxidizing free radicals necessary for oxidation, such as the reaction that generates the Fenton reagent OH*. These free radicals can oxidize the sulphur-containing and/or nitrogen-containing compounds extracted from the oily phase of hydrocarbons to the ionic liquid phase, owing to the extractive action of the ionic liquid when in contact with the oily phase.

In contrast to the examples from the literature cited above, which report methods using systems of the Fenton type containing ionic liquids, in the present invention the Fe(II) cation can be maintained permanently in the ionic liquid phase owing to the action of the ionophilic binder system of the organometallic salt complex, which is strongly solubilized by the ionic liquid.

Thus, the Fe(II) cation is not leached into the oily phase, which would cause contamination of the treated oily phase and loss of the performance of the reaction using the free radicals generated for selective oxidation of the target substances. Furthermore, maintaining Fe(II) in the ionic liquid phase allows its reuse as catalyst.

The ionic liquid, besides operating as a selective solvent, promoting immediate migration of the target substances from the oily phase to the ionic phase, where they are oxidized, can also ensure that the oxidized substances remain in the ionic phase.

DETAILED DESCRIPTION OF THE INVENTION

The present invention relates to a catalytic system for use in extractive oxidation processes for removing heteroatomic compounds of sulphur and/or nitrogen dissolved in hydrocarbons.

The catalytic system comprises an ionic liquid combined with an ionophilic organoferrous ionic complex, whose molecular structure contains the Fe(II) cation stabilized by an ionophilic binder system, this complex suitably being completely dissolved in the ionic phase, resulting in an ionic solution.

Oxidation is performed by free radicals, such as Fenton reagent OH*, generated from an oxidizing agent, preferably $H_2O_2$, by the catalytic action of Fe(II) present in the structure of the complex and stabilized in the ionic structure by the ionophilic binder system.

The process employing the catalytic system according to the present invention generates a two-phase system where an oily phase I contains the hydrocarbon mixture contaminated with sulphur-containing and nitrogen-containing compounds, and an ionic phase II contains a conventional ionic liquid and an ionophilic Fe(II) complex, with the catalytic action for oxidation, the binder being specific to prevent the Fe(II) migrating to the oily phase from the hydrocarbon mixture. The selective extractive power of the ionic liquid means that there is immediate migration of the target heteroatomic compounds from the oily phase (phase I) to the ionic phase (phase II), where they come into intimate contact with the organoferrous complex combined with the ionic liquid, maximizing the oxidation thereof.

The process disclosed here allows selective removal of sulphur-containing and/or nitrogen-containing compounds that are difficult to remove by the hydrofining process without using harsh operating conditions, as it may be conducted in mild conditions of atmospheric pressure and temperature throughout the reaction step.

This process uses an oxidizing agent, preferably hydrogen peroxide, so that sulphur-containing and nitrogen-containing compounds are removed, such as organic sulphides (for example, dibenzothiophenes) and basic nitrogen-containing aromatic compounds (for example, derivatives of pyridines, quinolines, acridines, etc.), which are typically present in the hydrocarbon streams of fossil origin, such as diesel, naphthas, gas oils, among others, and are difficult to remove by the refining processes for removal of sulphur and nitrogen normally used.

The ionic liquids used in the present invention consist of molecules derived from the 1,3-dialkylimidazolium cation, particularly the 1-n-butyl-3-methylimidazolium (BMI) cation and the anions: tetrafluoroborate ($BD_4^-$), hexafluorophosphate ($PF_6^-$) and bis-trifluoromethanesulphonimidate ($N(SO_2CF_3)_2^-$).

The present invention preferably employs the ionic liquid 1-n-butyl-3-methylimidazolium bis-trifluoromethanesulphonimidate ($BMI.N(SO_2CF_3)_2$, also called 1-n-butyl-3-methylimidazolium N-triflate ($BMI.NTf_2$), this nomenclature being employed hereinafter. The organometallic complex (catalyst) consisting of an Fe(II) cation and an ionophilic binder system was added to the BMI.NTf2.

The complex of iron(II) with the ionophilic binder system, adopted as the catalyst of the present invention, is an organic salt whose cation is an ionophilic binder, system suitably consisting of molecules of binders L1, L2 and L3, which complex the Fe(II) cation. Each of these binder molecules may be prepared from an iron(II) salt and an organic cation salt, this cation having at least one nitrogen atom (Lewis base), a component of aliphatic, or aromatic, or alicyclic molecular structure, or a combination thereof.

The complex of iron(II) salt with the ionophilic binder system is added to the ionic liquid selected. After homogenizing the mixture, an oily stream of hydrocarbons of mineral or synthetic origin containing sulphur-containing and/or nitrogen-containing compounds, such as streams of light and middle distillates derived from petroleum, is added, and finally the oxidizing agent (suitably hydrogen peroxide) is added.

This heterogeneous mixture is preferably heated to temperatures that vary from 20 to 150° C. and is stirred at atmospheric pressure for periods of from 5 to 250 minutes. The reaction of the organic complex of Fe(II), combined with the ionic liquid, with hydrogen peroxide generates free radicals, potentiating the oxidation of the target species, extracted from the oil by the ionic liquid.

The oxidation process takes place in the ionic liquid phase that retains the oxidized compounds of sulphur (of higher polarity) and nitrogen, the hydrocarbon remaining in the upper phase, and the unwanted sulphur-containing and/or nitrogen-containing organic material thus being extracted from the hydrocarbon stream. The hydrocarbon may then be separated and the ionic liquid may be reused for the process of extractive oxidation of sulphur-containing and/or nitrogen-containing compounds in the hydrocarbon stream.

Leaching of iron cations to the hydrocarbon phase preferably does not occur in this process, owing to the capacity of the ionophilic binder system for keeping the iron cation in the structure of the complex intimately combined with the ionic liquid employed.

In a preferred embodiment, the iron(II) complex may be prepared by the reaction of iron(II) bromide and 4-((2,3-dimethyl-imidazol-1-yl)methyl)-4'-methyl-2,2'-bipyridine, using a reflux system, and is then stabilized by adding potassium hexafluorophosphate ($KPF_6$). After this step, it should ideally be extracted with dichloromethane:acetonitrile in 1:1 ratio. The complex formed is hexafluorophosphate of [tris-(4-((2,3-dimethyl-imidazol-1-yl)methyl-4'-methyl-2,2'-bipyridine] Iron(II)-Fe(dmbpy-Im)$_3$5PF$_6$. This synthesis is illustrated in the reaction presented below:

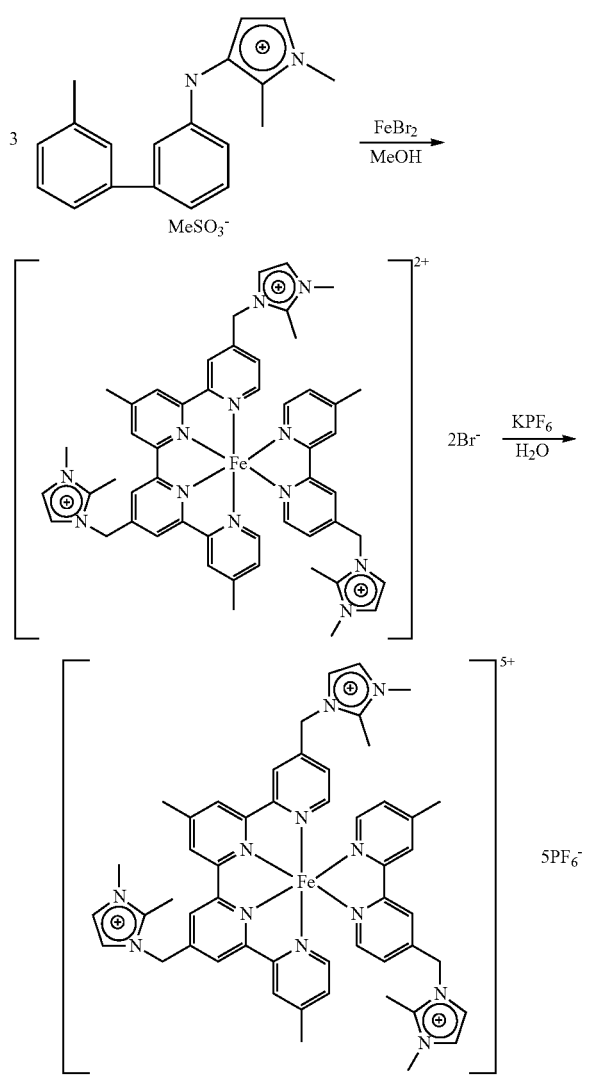

EXAMPLES

The following examples illustrate the embodiments of the process for removing heteroatoms from hydrocarbon streams according to the present invention and according to the prior art.

Comparative Example

The model fuel containing the sulphur compound was prepared by adding 0.0575 g of dibenzothiophene to 10 ml of n-octane (solution containing 1000 ppm of the organosulphur compound). Immediately afterwards, 0.5 ml of the ionic liquid BMI.NTf$_2$, the solution of the hydrocarbon (1.3 ml) and, lastly, 30% hydrogen peroxide (250 µl) are added to a 10-mL flask. This heterogeneous mixture is heated at 75° C. with magnetic stirring for 2.25 hours at atmospheric pressure. After the extractive oxidation process, it is observed that there is extraction of only 15% of the sulphur-containing compounds.

Example 2

The model fuel containing the sulphur compound was prepared by adding dibenzothiophene and bipyridine to 10 ml of n-octane (solution containing 1000 ppm of the organosulphur compound and 1000 ppm of the nitrogen-containing compound). The iron(II)-[Fe(dmbpy-Im)$_3$]$^{2+}$5PF$_6^-$ complex was added to the ionic liquid BMI.NTf$_2$. Immediately afterwards, 0.5 ml of the ionic liquid containing the complex, the solution of the hydrocarbon (1.3 ml) and, lastly, 30% hydrogen peroxide (250 µl) were added to a 10-mL flask. This heterogeneous mixture is heated at 75° C. with mechanical stirring for 2.25 hours at atmospheric pressure. After the extractive oxidation process, it was observed that there was less than 10 ppm of dibenzothiophene (DBT) in the hydrocarbon, which corresponds to removal of 99% of the sulphur-containing compound. Furthermore, migration of the iron catalyst to the oil phase was not detected.

Example 3

0.5 ml of ionic liquid BMI.NTf$_2$ containing the iron(II) complex with the ionophilic binder system, [Fe(dmbpy-Im)$_3$]$^{2+}$5PF$_6^-$, (1.96×10$^{-2}$ mmol g, 7.5%) is added to a 10-mL flask provided with a reflux condenser with water at 15° C. Next, 1.3 ml of refinery stream in the diesel oil range containing 113 ppm of S and 80 ppm of N and, finally, 250 µL of hydrogen peroxide, are added. This heterogeneous mixture is heated at 75° C. with magnetic stirring for 2.25 hours at atmospheric pressure. After the extractive oxidation process, removal of 64% of S and 82% of N is observed, i.e. the hydrocarbon phase has 40 ppm of S and 14 ppm of N.

Surprisingly, it was found that when a complex of iron(II) with the ionophilic binder system acting as catalyst is added to the ionic liquid, the efficiency of removal of sulphur-containing and/or nitrogen-containing compounds from the hydrocarbon streams increases considerably, besides ensuring that the iron(II) cation is not leached into the hydrocarbon phase, demonstrating the inventiveness of the present invention.

The invention claimed is:
1. Catalytic system for removing heteroatomic compounds from hydrocarbon streams, comprising an ionic liquid with 1,3-dialkylimidazolium cation, an anion and an organometallic complex of iron(II), in which the organometallic complex of iron(II) is an ionic system that consists of an organometallic cation of iron(11) with an ionophilic binder system and an anion.
2. Catalytic system according to claim 1, wherein the 1,3-dialkylimidazolium is based on the compound 1-n-butyl-3-methylimidazolium.
3. Catalytic system according to claim 1, wherein the anion is selected from the group consisting of tetrafluoroborate, hexafluorophosphate and bis-trifluoromethanesulphonimidate.

4. Catalytic system according to claim 1, wherein the organometallic complex of iron(11) is prepared from an iron(II) salt and an ionophilic binder precursor.

5. Catalytic system according to claim 1, wherein the organometallic complex of iron(II) is prepared from an iron(11) bromide salt and 4((2, 3-dimethyl-imidazol-1-yl)methyl)-4'-methyl-2,2'-bipyridine.

6. Extractive oxidation process for removing heteroatoms from hydrocarbon streams, comprising:
   a) providing a hydrocarbon stream of mineral or synthetic origin containing heteroatomic compounds to form phase I;
   b) providing a catalytic system and adding an oxidizing agent to form phase II, wherein the catalytic system comprises an ionic liquid with 1,3-dialkylimidazolium cation, an anion and an organometallic complex of iron(II), in which the organometallic complex of iron (II) is an ionic system that consists of an organometallic cation of iron(11) with an ionophilic binder system and an anion;
   c) promoting contact between phases I and II so that the reactions of oxidation of the heteroatomic compounds take place; and
   d) separating phase I, which comprises the hydrocarbon phase, from phase II, which comprises the phase of the ionic liquid combined with the organoferrous complex, where the oxidized heteroatomic compounds arising from the hydrocarbon stream are present.

7. Process according to claim 6, wherein the oxidizing agent is a peroxide.

8. Process according to claim 7, wherein the oxidizing agent is at least one inorganic peroxide.

9. Process according to claim 7, wherein the oxidizing agent is hydrogen peroxide.

10. Process according to claim 7, wherein the oxidizing agent is at least one organic peroxide.

11. Process according to claim 7, wherein the oxidizing agent is a mixture of at least one organic peroxide and at least one inorganic peroxide, in any proportions.

12. Process according to claim 6, wherein the heteroatomic compounds comprise at least one of sulphur-containing and nitrogen-containing compounds.

13. Process according to claim 6, wherein the oxidation reaction is carried out at a temperature varying from 50 to 150° C.

14. Process according to claim 6, wherein the oxidation reaction is carried out for periods of from 5 to 250 minutes.

15. Catalytic system according to claim 2, wherein the organometallic complex of iron(II) is prepared from an iron(11) bromide salt and 4((2, 3-dimethyl-imidazol-1-yl)methyl)-4'-methyl-2,2'-bipyridine.

16. Catalytic system according to claim 3, wherein the organometallic complex of iron(II) is prepared from an iron(11) bromide salt and 4((2, 3-dimethyl-imidazol-1-yl)methyl)-4'-methyl-2,2'-bipyridine.

17. Catalytic system according to claim 4, wherein the organometallic complex of iron(II) is prepared from an iron(11) bromide salt and 4((2, 3-dimethyl-imidazol-1-yl)methyl)-4'-methyl-2,2'-bipyridine.

18. Process according to claim 7, wherein the heteroatomic compounds comprise at least one of sulphur-containing and nitrogen-containing compounds.

19. Process according to claim 7, wherein the oxidation reaction is carried out at a temperature varying from 50 to 150° C.

20. Process according to claim 7, wherein the oxidation reaction is carried out for periods of from 5 to 250 minutes.

* * * * *

UNITED STATES PATENT AND TRADEMARK OFFICE
CERTIFICATE OF CORRECTION

PATENT NO. : 11,396,008 B2  
APPLICATION NO. : 16/620453  
DATED : July 26, 2022  
INVENTOR(S) : De Souza et al.

Page 1 of 1

It is certified that error appears in the above-identified patent and that said Letters Patent is hereby corrected as shown below:

On the Title Page

Item (22) PCT Filed:, delete "Jan. 8, 2018" and substitute therefor -- Jun. 8, 2018 --.

Signed and Sealed this  
Fourth Day of October, 2022

Katherine Kelly Vidal  
*Director of the United States Patent and Trademark Office*